July 31, 1962  C. A. BLUM  3,046,685
WREATH
Filed March 7, 1961

INVENTOR.
CHARLES A. BLUM
BY Arthur H. Seidel
ATTORNEY

United States Patent Office 3,046,685
Patented July 31, 1962

3,046,685
WREATH
Charles A. Blum, 40 Raynham Road, Merion, Pa.
Filed Mar. 7, 1961, Ser. No. 93,985
2 Claims. (Cl. 41—12)

This invention relates to a wreath, and more particularly to a wreath of the holiday type more commonly associated with the Christmas season.

Heretofore, it has been conventional in the art to make a holiday wreath in the form of an annulus and ship the same to its destination. I have found that the number of wreaths which can be shipped within a predetermined amount of space can be materially increased by making the wreaths in the form of an elongated strip, with means being provided so as to enable the wreath to be readily formed in the shape of an annulus at its destination.

In addition to reducing the shipping costs coincident with shipments of holiday wreaths, the provision of a wreath in the form of an elongated strip enables the same to be stored in that shape when not in use. This results in a material saving in storage space.

It is an object of the present invention to provide a novel wreath.

It is another object of the present invention to provide a novel wreath of the holiday type associated with the Christmas season.

It is another object of the present invention to provide a wreath in the form of an elongated strip capable of being readily shaped into the form of an annulus.

It is another object of the present invention to provide a novel wreath having artificial leaves and/or other decorations removably secured to the wreath.

It is still another object of the present invention to provide a novel wreath capable of being merchandised as a do-it-yourself kit.

It is still another object of the present invention to provide a novel wreath in the form of an elongated strip with means being provided for releasably securing the ends of said strip so as to shape the wreath in the form of an annulus.

It is a still further object of the present invention to provide a novel wreath of the holiday type wherein an integral plastic leaf member simulates a plurality of individual leaves.

It is another object of the present invention to provide a novel holiday wreath wherein leaves and/or berries are provided with a hub frictionally secured on mounting pins.

Other objects will appear hereinafter.

For the purposes of illustrating the invention there is shown in the drawings a form which is presently preferred; it being understood, however, that this invention is not limited to the precise arrangements and instrumentalities shown.

Figure 1:
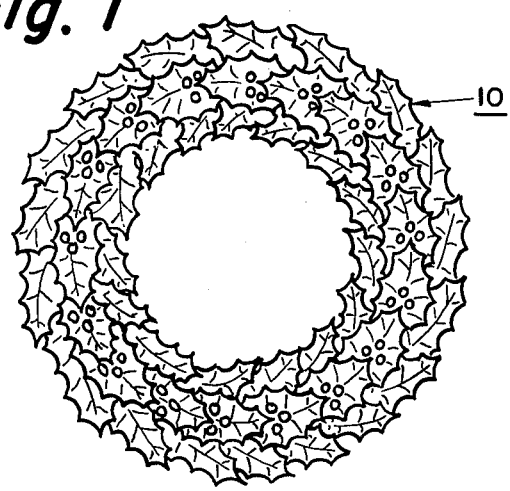
FIGURE 1 is a top plan view of a wreath made in accordance with the present invention, with the wreath shown in the form of an annulus.
Figure 2:
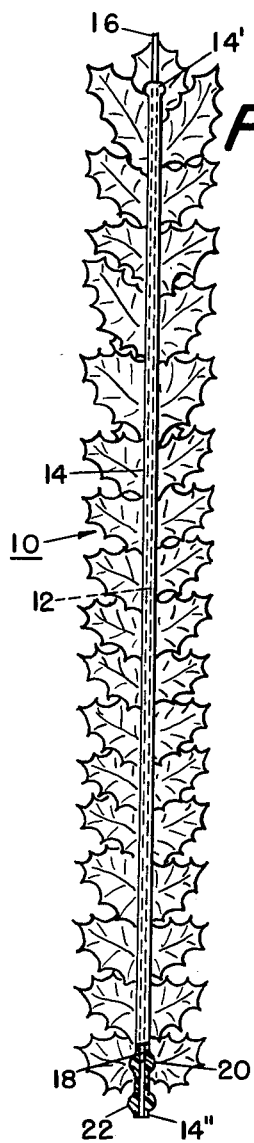
FIGURE 2 is a bottom plan view of the wreath of the present invention, with the wreath being shown in the form of an elongated strip.

Referring to the drawing in detail, wherein like numerals indicate like elements, there is shown in FIGURE 1 a top plan view of the wreath of the present invention designated generally as 10. In FIGURE 1, the wreath 10 is shown in the form of an annulus. In FIGURE 2, the wreath 10 is shown in the form of an elongated strip.

Figure 3:
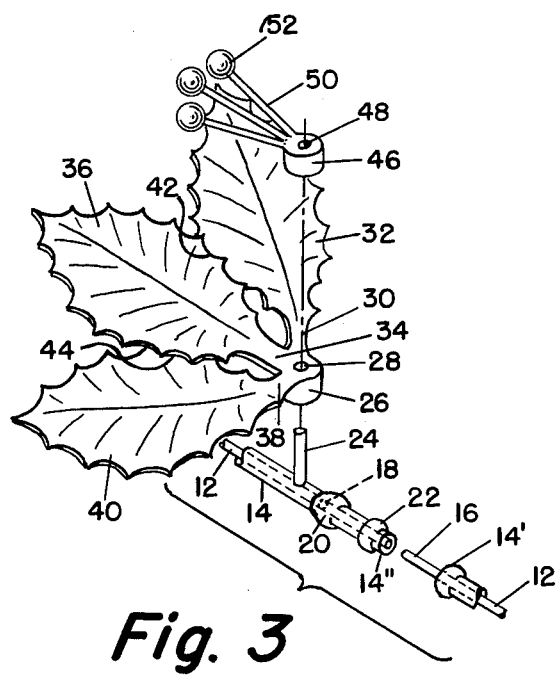
FIGURE 3 is a partial perspective exploded view of a portion of the wreath of the present invention.

The wreath 10 includes an elongated piece of flexible spring wire 12. Substantially the entire length of the wire 12 is encased in a plastic sheath 14. As shown more clearly in FIGURES 2 and 3, one end 14' of the plastic sheath 14 is remote from one end 16 of the wire 12. A small portion of the wire 12 extending from the end 16 is not encased by the plastic sheath 14. The other end 14" of the plastic sheath 14 extends beyond the other end 18 of the spring wire 12. The purpose for the relationship between the ends 16 and 18 of the wire 12 and the ends 14' and 14" of the sheath 14 will be made clear hereinafter.

The plastic sheath 14 is provided with an enlarged portion or bead 20. The end 18 of the wire 12 is disposed within that portion of the sheath 14 coincident with the bead 20. The sheath 14 is also provided with a bead 22 adjacent the end 14'. The beads 20 and 22 are primarily provided for reinforcement purposes.

A plurality of upright pins are provided on the sheath 14. The pins 24 are integrally formed with the sheath 14 and are in alignment with each other. As shown more clearly in FIGURE 3, the pin 24 has a diameter slightly smaller than the diameter of the sheath 14 and extends in a direction substantially perpendicular to the longitudinal axis of the sheath 14.

The pin 24 is adapted to receive a hub 26. The hub 26 is provided with a bore 28. The diameter of the bore 28 is substantially identical with the diameter of the pin 24, and the bore 28 is adapted to receive the pin 24 with a frictional fit.

A stem 30 for a leaf 32 is integrally connected to the hub 26. A stem 34 for a leaf 36 is integrally connected with the hub 26. A stem 38 for leaf 40 is integrally connected with the hub 26. The leaves 32 and 36 are integrally connected along the juncture line 42. The leaves 36 and 40 are integrally connected along the juncture line 44. The leaves 32, 36 and 40 are formed at the same time as the hub 26 in a single molding operation. Accordingly, the leaves 32, 36, and 40 and the hub 26 are mounted on the pin 24 at the came time as a single unit.

A hub 46 is also adapted to be mounted on the pin 24 with a friction fit between the pin 24 and the bore 48 of the hub 46. The pin 24 has a length slightly greater than the thickness of the hubs 26 and 46. A plurality of stems 50 are integrally connected with the hub 46. A berry 52 is integrally connected with the end of each stem 50 remote from the hub 46.

The sheath 14, the pins 24, the leaves and the berries are preferably made from a synthetic resin such as polyethylene. Preferably, the sheath, pins, and leaves are green in color while the berries are red in color.

The wreath 10 of the present invention is utilized in the following manner:

The wreath 10 is shipped to its destination, sold, and stored as an elongated strip as shown in FIGURE 2. When it is desired to use the wreath 10 of the present invention in the form of an annulus as shown in FIGURE 1, the flexible spring wire enables the wreath 10 to be readily shaped in the form of an annulus. In forming the annulus shape of the wreath 10, the end 16 of the wire 12 is inserted into the end 14" of the sheath 14 until the ends 14' and 14" are in abutting contact. When the ends 14' and 14" of the sheath 14 are in abutting contact, the ends 16 and 18 of the wire 12 will be adjacent one another withing the bead 20 on the sheath 14. The bead 20 reinforces the sheath 14 and resists the tendency of the wire 12 to uncoil itself.

By properly positioning the pins 24, the leaves will conceal the beads 20 and 22 as well as the juncture between the ends 14' and 14" of the sheath 14. Accordingly, when the wreath 10 of the present invention is in the form of an annulus as shown in FIGURE 1, the juncture between the ends of the sheath 14 are concealed from view. The wreath 10 of the present invention will remain in the shape of an annulus as shown in FIGURE 1 until the end 16 of the wire 12 is withdrawn from that portion of the sheath 14 between the bead 20 and the end 14".

The wreath 10 of the present invention may be merchandised as a do it yourself kit since the leaves and berries with their associated hubs are removably secured to the ends 24 on the sheath 14. Accordingly, the wreath 10 of the present invention may be assembled into strip form as shown in FIGURE 2 by the user if desired.

The present invention may be embodied in other specific forms without departing from the spirit or essential attributes thereof and, accordingly, reference should be made to the appended claims, rather than to the foregoing specifications as indicating the scope of the invention.

I claim:
1. A holiday wreath comprising a plastic wire-like member having integral pins extending therefrom in a direction substantially perpendicular to the longitudinal axis of said member, said pins being disposed at spaced points along the length of said member, said member having two free ends, one end of said member having a hollow portion frictionally receiving the other end of said member, a plurality of hubs corresponding in number to to the number of pins, each hub having a plurality of simulated holly leaves integrally connected therewith and extending outwardly therefrom in a direction substantially perpendicular to the longitudinal axis of said pins, means frictionally and releasably securing each hub to a separate one of said pins in a manner so that said hubs are frictionally interconnected with said pins in all angular dispositions of said member and so that the simulated leaves may be removed in a direction corresponding to the longitudinal axis of its respective pin without interfering with the mounting of other simulated leaves, and at least one simulated berry having a hub frictionally and releasably secured to each pin.

2. A holiday wreath in accordance with claim 1 wherein said plastic wire-like member includes a flexible spring wire core coated substantially along its entire length by a sheath of plastic material, and said pins being integral with said sheath of plastic material.

References Cited in the file of this patent
UNITED STATES PATENTS

| | | |
|---|---|---|
| 1,694,125 | Jopson | Dec. 4, 1928 |
| 2,826,846 | Warren | Mar. 18, 1958 |
| 2,855,713 | Jaremo | Oct. 14, 1958 |
| 2,915,891 | Vealey | Dec. 8, 1959 |
| 2,984,036 | Adler | May 16, 1961 |